Feb. 29, 1972 D. W. SICKELS ET AL 3,645,877
ELECTROCHEMICAL DEBURRING APPARATUS
Filed Oct. 13, 1969 2 Sheets-Sheet 1
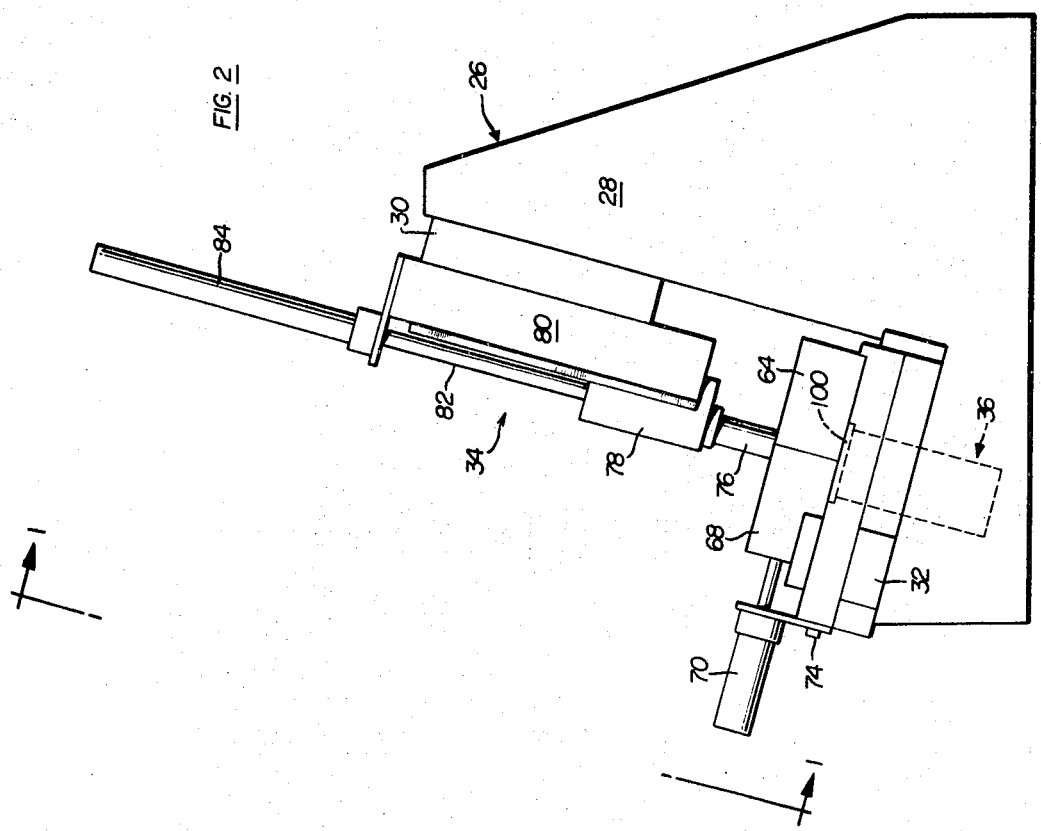
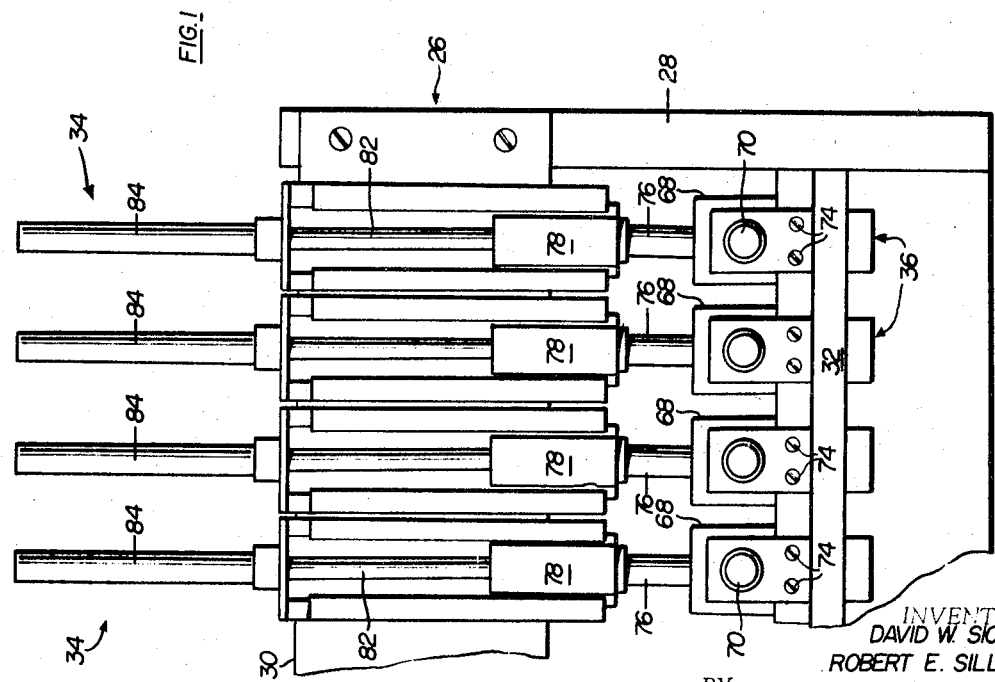
INVENTORS
DAVID W. SICKELS.
ROBERT E. SILLS.
BY CULLEN, SETTLE,
SLOMAN & CANTOR.
ATT'YS.

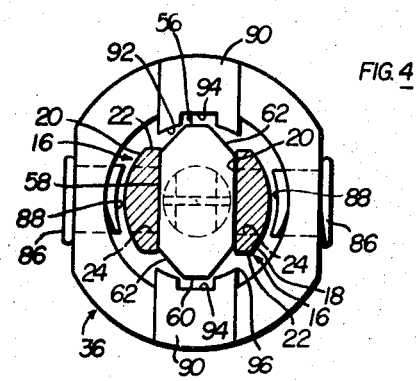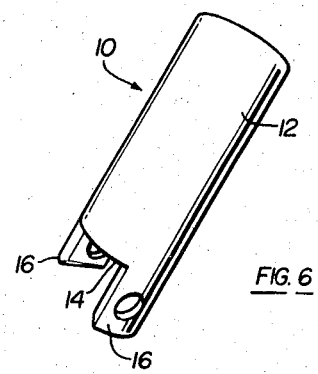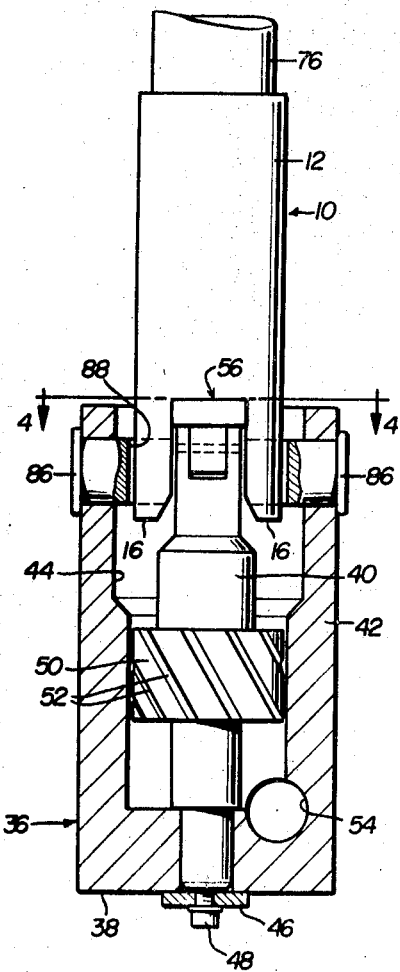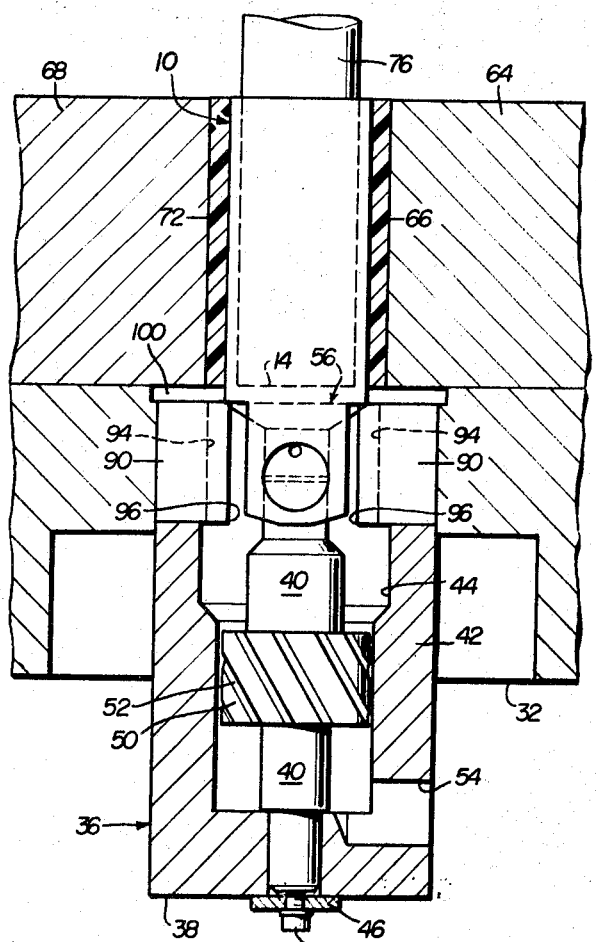

United States Patent Office 3,645,877
Patented Feb. 29, 1972

3,645,877
ELECTROCHEMICAL DEBURRING APPARATUS
David W. Sickels, Plymouth, and Robert E. Sills, Livonia, Mich., assignors to Electrogenics, Inc., Wayne, Mich.
Filed Oct. 13, 1969, Ser. No. 865,874
Int. Cl. B23p 1/04, 1/12
U.S. Cl. 204—224     8 Claims

ABSTRACT OF THE DISCLOSURE

Electrochemical deburring apparatus for a workpiece including a nonconductive support structure, and a tool electrode mounted on the support structure connected to the negative terminal of a power source. The tool electrode comprises a base, a center shaft extending upwardly from the base, and an outer sleeve extending upwardly from the base concentric with the center shaft and defining a cavity therebetween. The tool electrode has a conduit in the lower portion of it through which electrolyte under pressure is introduced into the cavity. The tool electrode has means for causing turbulent flow of electrolyte while it is in the cavity.

An insulated stop is mounted on the top of the center shaft of the tool electrode and is adapted for cooperating fit within a recess of a workpiece when the workpiece is seated on the tool electrode, thereby radially aligning the workpiece. The apparatus also has insulated means for clamping the workpiece in position on the tool electrode with the insulated stop in contact with the workpiece, and ears of the workpiece having edges to be deburred projecting into the cavity of the tool electrode between the center shaft and the outer sleeve. The apparatus also includes means for inserting an electrode connected to the positive terminal of a power source into the workpiece, whereby when electrolyte is passed between the tool electrode and the workpiece and direct current is passed between the workpiece and the tool electrode, the desired areas of the workpiece are deburred. Also disclosed is a method of deburring workpieces.

BACKGROUND OF THE INVENTION

This invention relates to apparatus for electrochemically deburring metallic parts of complicated shape.

Electrochemical machining of metallic parts is a fairly new development in the metal working field. The technique is used to cut and shape metal parts, as well as deburr them. It is particularly suitable for use with small stamped or machined parts of complicated design where it is difficult, if not impossible, to remove the burrs left on by the stamping or machining operation. In electrochemical deburring, metal removal is accomplished by means of electrolysis. Conventionally, direct current is applied between two pieces of metal submerged or in contact with a suitable electrolyte. One of the pieces, the workpiece from which removal of metal is desired, is made the anode, and the other piece is made the cathode. The cathode is especially designed to function best with the specific workpiece being operated upon. The electrolyte is continuously circulated and is made to flow sufficiently fast that it carries the metal ions given off from the anode with it, and hydrogen gas is generated at the cathode.

The most commonly used electrolyte is a water solution of sodium chloride, although other electrolytes can be used.

When direct current is applied between the electrodes, it flows between the anode metal workpiece and the cathode along the paths of least resistance, the high points on the workpiece. Metal is removed by anodic deplating. Since more metal is removed at points of greatest current flow, the high points on the workpiece will be removed first, thus smoothing out or deburring the workpiece. At the finish there is substantially equal current density at all points.

The basic principles of electrochemical machining are well known to those skilled in the art.

Because each workpiece to be machined or deburred is in general a unique shape, and because apparatus designed to be used with workpieces of one shape cannot be used efficiently or accurately with workpieces of another shape, new apparatus for use in conjunction with each distinctly shaped workpiece must be invented.

Electrochemical machining apparatus is contemplated for rapidly and efficiently deburring workpieces.

Also contemplated is electrochemical machining apparatus which facilitates rapid loading and unloading of the workpieces so that the deburring can be carried out.

Further contemplated is electrochemical machining apparatus that clamps workpieces in such a way as to protect already machined surfaces which are not to be machined and also in a unique way incorporates the workpiece into the machining circuit.

More specifically contemplated is electrochemical machining apparatus incorporating a unique electrode structure that delivers both current and electrolyte to the areas to be deburred without concern for secondary machining effects.

Also, an objective is electrochemical machining apparatus having novel provision for not only retaining and locating the workpieces but also unique provision for distributing the electrolyte to the surfaces to be deburred.

The foregoing and other objects and advantages of the invention will become apparent from the following description and accompanying drawings, in which:

FIG. 1 is a front view of a plurality of individual deburring units of the invention mounted on a support structure;

FIG. 2 is a side view of the arrangement shown in FIG. 1;

FIG. 3 is a front view, partly in cross-section, with parts broken away of an individual deburring unit of the invention;

FIG. 4 is a top view through the line 4—4 of FIG. 3;

FIG. 5 is a side view, partly in cross-section, with parts broken away, of an individual deburring unit of the invention; and FIG. 6 is a perspective view of a workpiece which is operated upon by an individual deburring unit of the invention.

In order that the electrochemical apparatus of this invention can be more completely understood the workpiece to be operated upon will be described first.

As seen in FIG. 6, the workpiece is a follower cam roller 10. The roller 10 comprises a hollow tubular section 12 closed off at one end by a web 14. A pair of opposed ears 16 extend beyond the web 14. The opposed ears 16 and the web 14 form a recess therebetween. Each ear 16 has a curved outer surface 18 (see FIG. 4) which is an extension of the tubular section 12, and a flat inner surface 20.

The inner surfaces 20 of the opposed ears are parallel. Each ear also has parallel flat side surfaces 22 connecting the outer surface 18 with the inner surface 20. Each ear has an orifice 24 in it. The orifices 24 of opposed ears 16 are on the same axis.

The need for deburring occurs on each ear 16 at the edges formed by the intersection of the outer surface 18 with the side surface 22, and the inner surface 20 with the side surface 22, as well as the peripheral edge of the orifice 24, and the edges formed at the top of the ear.

The electrochemical deburring apparatus of this invention used in deburring the above described workpiece, or a workpiece of similar construction, comprises a non-conducting support unit 26 (preferably plastic) consisting of opposed vertical legs 28 connected by a upper horizontal support plate 30, and a lower horizontal support plate 32, upon which is mounted a plurality of individual deburring units 34.

As best seen in FIGS. 3, 4, and 5, the deburring unit 34 comprises a total electrode 36 which includes a base 38, a center shaft 40 mounted in a bore in the base 38 and extending upwardly therefrom, and a sleeve 42 extending upwardly from the base 38 whose inner wall is concentric with the center shaft 40. A cavity 44 is formed between the sleeve 42 and the center shaft 40. The tool electrode 36 is mounted in a bore (not shown) in the lower plate 32 by suitable means. An electrical lead 46 is fastened to the base 38 of the tool electrode 36 by means of a screw 48 fastened to the bottom of the center shaft 40. The lead 46 is connected to the negative terminal of a direct current power source (not shown).

A collar 50 having a plurality of angular grooves 52 cut into the outer surface thereof is mounted on the lower end of the center shaft 40. The collar 50 has a clearance fit with the inner wall of the sleeve 42.

A conduit 54, through which electrolyte is pumped, is cut into the electrode 36 at the intersection of the base 38 and sleeve 42. Electrolyte is pumped through the conduit 54 into the lower end of the cavity 44 formed between the sleeve 42 and the center shaft 40. Electrolyte then passes through the grooves 52 in the collar 50 is thrown out on the upper side of the collar 50 in a swirling motion, thus effecting turbulence of the electrolyte.

An insulating stop 56 is attached to the top of the center shaft 40. The stop 56 is hexagonal in shape and has long parallel opposed sides 58 and short parallel opposed sides 60 connected by beveled sides 62.

The workpiece 10 is placed over the stop 56 and the upper part of the shaft 40 in a manner such that the web 14 rests on the top surface of the stop 56 and the ears 16 project partially into the cavity 44 formed by the cylindrical sleeve 42 and the shaft 40. The parallel long sides 58 of the stop 56 fit in the space between the opposed flat inner surfaces 20 of the projecting ears 16 of the workpiece. The parallel long sides 58 of the stop 56 extend less than the length of the opposed inner flat inner surfaces 20 of the ears 16, thus leaving the edges where the flat inner surfaces 20 of the ears 16 and the parallel side surfaces 22 meet, free. The workpiece 10 is radially aligned when it is positioned on the stop 56 since the workpiece cannot be moved radially once it is seated.

The tubular section 12 of the workpiece 10 is supported on one side by a fixed non-conducting support block 64 mounted on the lower plate 32. The face of the support block 64 adjacent the workpiece 10 is complementary to the surface of one half of the tubular section 12, and has a urethane 66 surface to provide insulation. A movable non-conducting clamp 68 actuated by a piston 70 is supported on the lower plate 32 on the side opposite the workpiece 10. The clamp 68 is used to clamp the tubular section 12 tightly against the fixed support block 64, thus securely holding the workpiece 10 in position. The face of the clamp 68 is shaped complementary to one half of the tubular section 12. It also has a urethane 72 surface. The clamp 68 and support block 64 completely enclose the tubular section 12 when the clamp 68 is in position, thus protecting the tubular section 12 from inadvertent electrolytic action. The piston 70 is fastened to the lower plate 32 with screws 74.

An electrode 76 is mounted on the lower end of a movable plastic block 78 confined within parallel ways 80 mounted on the upper plate 30 of the support unit 26. The block 78 is actuated by the shaft 82 of a piston 84 mounted on the upper end of the ways 80. An electrical conduit connected to the positive terminal of a power source is attached to the electrode 76 by suitable means (not shown).

Once the workpiece 10 is placed in position over the stop 56 and clamped in place, the electrode 76 is moved downwardly into the cavity of the tubular section 12 with the bottom of the electrode 76 being in contact with the surface of the web 14 at the bottom of the tubular section 12. Thus the workpiece 10 itself becomes a conductor of electricity and in effect becomes the positive electrode in the apparatus of the invention.

The sleeve 42 of the electrode 36 has a pair of opposed electrode inserts 86 in it positioned adjacent and in close proximity to the peripheral edges of the orifices 24 in the ears 16. The inserts 86 themselves are circular and correspond approximately in diameter to the diameter of the orifices 24. The inserts have faces 88 which have the same curvature as the outer surfaces 18 of the ears 16. The inserts 86 project inwardly beyond the inner wall of the sleeve 42 in order that the peripheral edges of their faces 88 are as close as possible, within the operable limits, to the peripheral edges of the orifices 24 to be deburred.

Another set of electrode inserts 90 is attached to the sleeve 42 in opposed relation to the exposed edges of the ears 16. Each electrode insert 90 has a cylindrically concave face 92 with a vertical slot 94 in the middle of it, and outer edges 96 which are closer to the exposed edges of the ears 16 than any other part of the face 92. The edges 96 are as close as possible, within operable limits, to the closest exposed edges of the opposed ears 16.

In operation a workpiece 10 is seated in the electrode 36 and clamped into a stationary position with the movable clamp 68. Following this, the electrode 76 is lowered into the tubular section 12 of the workpiece 10 and the end of the electrode is made to contact the web 14 closing off the tubular section 12. Then electrolyte is pumped through the conduit 54 into the cavity 44 of the electrode 36 and forced through the grooves 52 in the collar 50, thus creating a turbulent flow of the electrolyte. The electrolyte is forced through the gaps between the electrode inserts 86 and 90 and the exposed edges of the ears 16 and the orifices 24 in the ears, and then out of the top of the electrode 36, through a space 100 unit 26 and into a catch basin which is not shown. After the electrolyte is flowing, the electrode 76 is energized with direct current. The current then travels from the workpiece 10 through the electrolyte to the inserts 86 and 90 of electrode 36. After a suitable period of time, the power is turned off and the flow of the electrolyte stopped, after which the clamp 68 is released and the electrode 76 raised, allowing the workpiece 10 to be removed. A new workpiece is then inserted and the cycle is begun again.

In the practice of the invention and in the apparatus shown herein, it has been found that optimum results have been achieved when the gap between the peripheral edges of the orifices 24 and the peripheral edges of the electrode inserts 86; and the exposed edges of the ears 16 and the edges 98 of the inserts 90; is about .060 inch. Suitable results are achieved when the gap ranges from about .030 inch to .125 inch. Preferably the power source is operated at about 17–19 volts and 150–225 amps, for about 10 to 20 seconds, and the electrolyte is pumped between the electrode 36, the electrode inserts 86 and 90, and the workpiece 10 at a rate of from about 5 to 10 gallons per minute. The electrolyte is introduced into the electrode 36 at a pressure of from 30 to 50 p.s.i.g. The temperature of the electrolyte solution is preferably from 95° F. to 110° F.

Suitable electrolytes for use in the apparatus of the invention and process described herein includes highly concentrated solutions of sodium chloride or sodium nitrate. Other suitable solutions are described in U.S. Pat. No. 3,058,895.

It has been found that optimum results are achieved only when the flow of electrolyte through the gap between the edges of the workpiece to be deburred and the electrode inserts, sometimes known as the electrolytic deburring gap, is a turbulent nature. Thus, for optimum results it is essential that the tool electrode contain some means to cause a nonlaminar flow of the electrolyte up through the cavity.

While the apparatus of this invention has been described in connection with a workpiece having a particular construction, it can be appreciated that the apparatus can be used to deburr any workpiece having projecting ears or other parts to be deburred which can be inserted in the gap between the sleeve 42 and the center shaft 40 of the tool electrode 36.

Further, while optimum results are achieved with the use of the inserts 86 and 90 in the sleeve 42, these can be eliminated from the tool electrode 36, leaving only the sleeve 42 and the center shaft 40, with satisfactory results. The same gap relationships between the workpiece and the tool electrode should be observed, however.

We claim:

1. In an electrochemical deburring apparatus for a workpiece, wherein the workpiece comprises a tubular section closed off at one end by a cross web and a pair of diametrically opposed ears extending vertically from the cross web, each of the ears having an outer surface which is a continuation of the outer surface of the tubular section, a flat inner surface, and flat parallel side surfaces, and an orifice therein having the same axis as the orifice in the opposite ear, the opposed ears and the cross web defining a recess therebetween, the combination of: a non-conductive support structure, a negative electrode mounted on said support structure comprising a base, a center shaft extending upwardly from said base, a sleeve extending upwardly from said base concentric with said center shaft and defining a cavity therebetween, means for introducing electrolyte under pressure into said cavity near said base, means for causing turbulent flow of electrolyte while in said cavity, an insulated stop mounted on the top of said center shaft adapted for cooperating fit within the recess of said workpiece when said workpiece is seated on said negative electrode, thereby radially aligning said workpiece, insulated means for clamping said workpiece in position on said negative electrode with said insulated stop in contact with said web and said ears projecting into said cavity between said center shaft and said outer sleeve, means for inserting a positive electrode into the cavity of said tubular section and in contact with said web, and circuit means for connecting said positive and negative electrodes to a source of direct current, whereby direct current flows through said positive electrode, said workpiece, said electrolyte and into said negative electrode.

2. The apparatus as described in claim 1 which further include a pair of opposed circular concave faced electrode inserts mounted in said outer sleeve and projecting inwardly into said cavity, the perimeter of the face of each of said inserts being spaced from the perimeter of the orifice in the ear of said workpiece closest thereto a distance of about .060 inch, said inserts being on the same axis as said orifices.

3. The apparatus as described in claim 1 wherein the insulated stop has a flat surfaced head which is hexagonal shaped in top view, said head having two parallel long sides which are adapted to fit within the space defined by the opposed inner sides of said ears, two parallel short sides, and four beveled sides, each one of which beveled sides connects one end of each long side with one end of each short side, the long sides of said head being of a length less than the horizontal width of the inner surface of said ears, thus leaving the intersecting edges of the inner surface of said ears and the parallel side surfaces, and the intersecting edges of the outer surface of said ears with the parallel side surfaces exposed.

4. The apparatus as described in claim 1 which further includes a pair of opposed concave faced electrode inserts mounted on said sleeve and projecting inwardly into said cavity, the edges of said inserts being equidistantly spaced from the intersecting edges of the inner faces and parallel side faces of said ears closest thereto and being about .060 inch.

5. The apparatus of claim 1 wherein said means for causing turbulent flow of electrolyte is a collar mounted on said center shaft having angled grooves therein which direct the flow of electrolyte passing therethrough in a non-laminar direction.

6. The apparatus of claim 1 wherein said means for inserting a positive electrode into the cavity of said tubular section is a movable piston mounted above said tubular cavity having a positive electrode adapted to fit within the confines of the cavity of said tubular section mounted on the end thereof.

7. The apparatus of claim 1 wherein the sleeve of said electrode has multiple projections extending therein juxtaposed with the edges to be deburred.

8. The apparatus of claim 1 wherein the means for clamping said workpiece in position on said negative electrode comprises a fixed support block having an insulating face adjacent the workpiece mounted on said support element and a clamping block having an insulating face adjacent the workpiece mounted on the opposite side from said fixed support block, and which is attached to the shaft of an air piston which is movable back and forth.

References Cited
UNITED STATES PATENTS

| | | | |
|---|---|---|---|
| 3,326,785 | 6/1967 | Williams | 204—272 X |
| 3,429,798 | 2/1969 | Beck et al. | 204—224 X |
| 3,582,525 | 6/1971 | Hahn et al. | 204—272 X |
| 3,399,130 | 8/1968 | Lovekin | 204—206 |
| 3,466,235 | 9/1969 | Williams | 204—224 |
| 3,475,303 | 10/1969 | Sadler et al. | 204—143 M |

JOHN H. MACK, Primary Examiner

D. R. VALENTINE, Assistant Examiner

U.S. Cl. X.R.

204—225, 272, 275